United States Patent [19]

Halling

[11] Patent Number: 5,442,011
[45] Date of Patent: Aug. 15, 1995

[54] POLYMERIC FLUOROCARBON SILOXANES, EMULSIONS AND SURFACE COATINGS THEREOF

[75] Inventor: Robert A. Halling, Wilmington, Del.

[73] Assignee: E. I. du Pont de Nemours and Company, Wilmington, Del.

[21] Appl. No.: 205,988

[22] Filed: Mar. 4, 1994

[51] Int. Cl.⁶ .............................................. C08L 83/06
[52] U.S. Cl. .............................. 524/873; 106/287.11; 106/287.16; 428/447; 528/14; 528/38; 528/42; 556/424; 556/425
[58] Field of Search .................. 556/425, 424; 528/38, 528/42, 14; 524/837; 106/287.11, 287.16; 428/447

[56] References Cited

U.S. PATENT DOCUMENTS

| | | | |
|---|---|---|---|
| 3,012,006 | 12/1961 | Holbrook et al. | 260/46.5 |
| 3,422,131 | 1/1969 | Pittman et al. | 260/448.2 |
| 3,442,664 | 5/1969 | Heine | 106/2 |
| 3,450,738 | 6/1969 | Blochl | 260/448.8 |
| 4,024,306 | 5/1977 | Takamizawa et al. | 427/387 |
| 4,089,882 | 5/1978 | Takamizawa et al. | 260/448.2 |
| 4,525,425 | 6/1985 | Church | 428/428 |
| 4,549,003 | 10/1985 | Lim et al. | 528/42 |
| 4,648,904 | 3/1987 | DePasquale et al. | 106/2 |
| 4,687,707 | 8/1987 | Matsuo et al. | 428/336 |
| 4,689,181 | 8/1987 | Blatch | 260/408 |
| 4,877,654 | 10/1989 | Wilson | 427/387 |
| 4,983,459 | 1/1991 | Franz et al. | 428/410 |
| 4,990,377 | 2/1991 | Wilson | 427/387 |
| 5,011,963 | 4/1991 | Ogawa et al. | 556/485 |
| 5,051,129 | 9/1991 | Cuthbert et al. | 106/2 |
| 5,059,649 | 10/1991 | Maxson et al. | 524/398 |
| 5,064,544 | 11/1991 | Lin et al. | 556/424 |
| 5,073,422 | 12/1991 | Konno et al. | 528/42 |
| 5,124,467 | 6/1992 | Rodgers et al. | 556/427 |
| 5,274,159 | 12/1993 | Pellerite et al. | 556/485 |

OTHER PUBLICATIONS

Alastair W. Stupart, Water Repellant Treatments For Brickwork, Oct., 1993, 809–811.

Primary Examiner—Melvyn I. Marquis

[57] ABSTRACT

Novel polymeric fluorocarbon siloxane represented by the formula:

$$R_1\{-OSi(R_a)(OR_1)_x\{-OSi(R_b)(OR_1)]_y\{-OSi(R_c)(OR_1)]_z-OR_1$$

and corresponding polymeric branched structures wherein $R_a$ is a perfluoroalkyl radical, $R_b$ is an aminoalkyl or substituted aminoalkyl radical and $R_c$ hydrocarbyl, substituted hydrocarbyl phenyl, substituted phenyl or cyanoalkyl radical are shown to form stable aqueous emulsions without the use of volatile organic solvents and by a low energy processing. These emulsion are found to be highly hydrolyzed in solution without leading to precipitation via intermolecular condensation The emulsions when applied to substrates impart both oil and water repellent properties as well as improved lubricity.

19 Claims, No Drawings

POLYMERIC FLUOROCARBON SILOXANES, EMULSIONS AND SURFACE COATINGS THEREOF

BACKGROUND OF THE INVENTION

1. Field of the Invention

The present invention relates to preparation and use of novel polymeric organofluorosilicon compounds and their corresponding aqueous emulsions to impart water and oil repellent properties to substrates coated therewith. More specifically, this invention relates to hydrophobic and oleophobic polymeric fluorocarbon siloxanes and emulsions thereof.

2. Description of the related art

It is known that hydrolyzable silanes can be formulated as aqueous solutions or emulsions that can be applied to various substrates to impart hydrophobic or water repellency properties. However, for these emulsions to achieve long term storage stability they must be buffered to specific pH ranges to inhibit or prevent the hydrolysis of the silanes in the aqueous medium (see for example, U.S. Pat. No. 4,990,377 and U.S. Pat. No. 4,877,654). It is also known that when hydrolyzable fluorocarbon silanes are applied to various surfaces, they can impart both water repellency and oil repellency to those substrates. However, those hydrolyzable fluorocarbon silanes are usually applied to surfaces in the molten state or dissolved in volatile organic solvents, and must generally be cured by heating with a catalyst to chemically affix the fluorocarbon silane to the substrates (U.S. Pat. No. 3,012,006). The use of such volatile solvents are generally harmful to the environment and may be hazardous due to their flammability. Where aqueous solutions or emulsions of the hydrolyzable fluorocarbon silanes are possible, the formulations cannot be stored for long periods of time, especially under a broad range of pH conditions, without undergoing hydrolysis and self-condensation to form water insoluble polymeric structures.

It is generally recognized (see, Silane Coupling Agents, E. P Plueddemann, 2 nd. Edition, Plenum Press, N.Y., 1991; and Silanes And Surfaces, D. E. Leyton, Gordon and Breach Science Publ., NY, 1986) that an important aspect of the durable oil and water repellency that is imparted to surfaces by hydrolyzable fluorocarbon silanes, such as with fluorocarbon alkoxysilanes, is the chemical bonding that occurs between the silane and the active hydrogen functional groups on the substrate. This is achieved by initial hydrolysis of the hydrolyzable groups on the silane to silanol groups, which then undergo condensation with the functionality on the substrate. The more hydrolyzable groups there are in the fluorocarbon silane to bond with the substrate, the more durable the coating will be. The normal method of achieving maximum bonding sites is to use a silane containing the maximum hydrolyzable groups on the silicon atom, which is three.

SUMMARY OF THE INVENTION

In view of the above, another method of achieving maximum bonding sites has been found which involves the preparation of a polymeric structure, such as a polysiloxane, containing many silicon atoms, with an average of one hydrolyzable group per silicon atom. With many hydrolyzable groups on the entire siloxane molecules, multiple silanol groups will be formed in the hydrolysis and these silanol groups may condense with the functions on the substrate at multiple sites, as well as with adjacent silanol groups attached to the surface. The result is a cross-linked and highly durable fluorocarbon siloxane structure on the surface of the substrate.

Thus according to the present invention, siloxane compositions have been discovered that incorporate (a) fluorocarbon groups which produce high levels of oil and water repellency on treated substrates, (b) ionizable groups that impart adequate hydrophilicity to the polysiloxane so that very stable aqueous emulsions may be prepared with the siloxane, without the aid of organic solvents, when selected emulsifiers are used, and (c) a multiplicity of hydrolyzable groups in the siloxane structures that form multiple sites for attachment of the siloxane to the substrate for enhanced durability. Also, hydrocarbon groups may be introduced to modify the repellency and emulsifiablity properties of the siloxane and to reduce cost of the siloxane.

Furthermore, unlike the solvent based fluorocarbon siloxanes of the prior art, spectroscopic data have shown that the aqueous fluorocarbonsilane emulsions of this invention contain the siloxane in an essentially completely hydrolyzed state ready for instant bonding to the substrate to provide the repellency properties. Yet the unique aqueous emulsions of this invention do not permit the hydrolyzed silanes to further self-condense to high molecular weight, water-insoluble, polysiloxane structures while in this emulsified state. These aqueous emulsions are generally stable to long term storage of one year or more, are stable to broad ranges of pH, from about 2.5 to about 9.0. are stable to temperatures of 60° C. or greater, and frequently are stable to repeated freezing and thawing conditions without undergoing coagulation and precipitation of the siloxane.

Thus the present invention provides (1) novel polymeric fluorocarbon siloxanes represented by the formula:

where $x=1$ to 100, $y=1$ to 10 times x, $z=0$ to 5 times x; $R_1=$ the same or different $-(CH_2CH_2-O-)_m R_2$ with $m=0$ to 5 and $R_2=C_1$ to $C_3$ alkyl; $R_a=R_f-Z-(CH_2-)_n$, where $R_f=$perfluoroalkyl of 3 to 18 carbons, $n=1$ to 3 and $Z=-CH_2-$ or $-O-$; $R_b=(R_3)_2N(CH_2CH_2NR_3-)_p$ pCH$_2$CH$_2$CH$_2-$ and $p=0$ or 1, $R_3=H$ or $C_1$ to $C_3$ alkyl; and $R_c=C_1$ to $C_{12}$ hydrocarbyl or halogen-containing hydrocarbyl, phenyl, substituted phenyl, or cyanoalkyl or corresponding branched polymeric structure, and (2) novel aqueous emulsions comprising 0.1 to 40 weight percent of the polymeric fluorocarbon siloxane and (3) coated surfaces comprising a substrate having deposited and dried thereon the novel emulsion.

The method according to the present invention of preparing stable polymeric fluorocarbon siloxane aqueous emulsions comprises the steps of:
(a) condensing an effective amount of;
(i) one or more perfluoroalkyl alkoxysilanes of the formula:

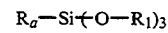

where $R_a=R_f-Z-(CH_2-)_n$ and $R_f=$perfluoroalkyl of 3 to 18 carbons, $n=1$ to 3, and $Z=-CH_2-$ or —O—; and $R_1$ = the same or different $-(CH_2CH_2)_m R_2$ with m=0 to 5 and $R_2 = C_1$ to $C_3$ alkyl, (ii) one or more substituted aminoalkyl alkoxysilanes of the formula:

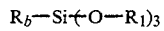

where $R_b = (R_3)_2N(CH_2CH_2NR_3)_p CH_2CH_2CH_2-$ and p=0 or 1, $R_3$ = H or $C_1$ to $C_3$ alkyl, and optionally (iii) one or more hydrocarbon silanes of the formula:

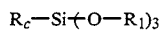 (4)

where $R_c = C_1$ to $C_{12}$ hydrocarbyl or halogen-containing hydrocarbyl, phenyl, substituted phenyl or cyanoalkyl thus producing a polymeric fluorocarbon siloxane represented by the formula:

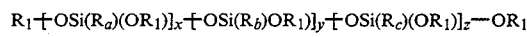

where x=1 to 100, y=1 to 10 times x, z=0 to 5 times x; $R_1$ = the same or different $-(CH_2CH_2)_m R_2$ with m=0 to 5 and $R_2 = C_1$ to $C_3$ alkyl; $R_a = R_f — Z-(CH_2)_n$, where $R_f$ = perfluoroalkyl of 3 to 18 carbons, n=1 to 3 and Z=—$CH_2$— or —O—; $R_b = (R_3)_2N(CH_2CH_2NR_3)_p$ $CH_2CH_2CH_2-$ and p=0 or 1, $R_3$ = H or $C_1$ to $C_3$ alkyl; and $R_c = C_1$ to $C_{12}$ hydrocarbyl or halogen-containing hydrocarbyl, phenyl, substituted phenyl, or cyanoalkyl or corresponding branched polymeric structures; and (b) suspending from 0.1 to 40 percent by weight of said polymeric fluorocarbon siloxane in water containing an effective amount of an emulsifier of sufficiently high HLB value to simultaneously retain said polymeric fluorocarbon siloxane in a substantially totally hydrolyzed state and inhibit said polymeric fluorocarbon siloxane from appreciable self-condensation and an effective amount of acid to at least partially neutralize the aminoalkylsilane ($R_b$) moieties thus forming a reactive aqueous emulsion.

One object of this invention is to produce hydrolyzable polymeric siloxane compositions that can readily be formulated into aqueous emulsions without the use of organic solvents, and which exhibit long term storage stability in this emulsified state. Another object of this invention is to render substrates both water repellent and oil repellent by the application of the aqueous emulsions of the hydrolyzable fluorocarbon silanes without the need for special curing operations.

DESCRIPTION OF THE PREFERRED EMBODIMENTS

The compounds of this invention are polymeric siloxanes of the following formula:

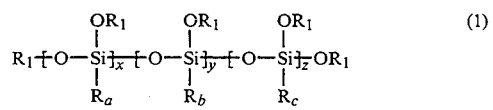 (1)

which for purposes of this invention is also represented as:

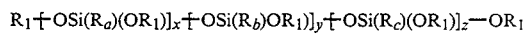

where x=1 to 100, y=1 to 10 times x, z=0 to 5 times x; $R_1$ = the same or different $-(CH_2CH_2)_m R_2$ with m=0 to 5 and $R_2 = C_1$ to $C_3$ alkyl; $R_a = R_f—Z-(CH_2)_n$, where $R_f$ = perfluoroalkyl of 3 to 18 carbons, n=1 to 3 and Z=—$CH_2$— or —O—; $R_b = (R_3)_2N(CH_2CH_2NR_3)_p$ $CH_2CH_2CH_2-$ and p=0 or 1, $R_3$ = H or $C_1$ to $C_3$ alkyl; and $R_c = C_{12}$ to hydrocarbyl or halogen-containing hydrocarbyl, phenyl, substituted phenyl, or cyanoalkyl.

Formula 1 gives a structural representation and is not meant to specify literally the sequence of silane units in the polymeric chain. That is, the three different silane units of x, y, and z occurrence may be randomly distributed throughout the structure (i.e., randomly copolymerized), or some or all of similar units may be grouped together (i.e., block or partially block copolymerized). Also, the chain may be substantially linear or it may contain branched segments (again not literally represented structurally in the formula). It should be appreciated that in the case of branching the branch point will involve a silicon bonding to three or conceivably four other silicones via oxygen or siloxane bonds (i.e., relative to the above formula the $OR_1$ at the branch point is, itself, one of the reoccurring silane units).

These polysiloxanes are produced by the hydrolysis/condensation reaction of mixtures containing:

A. One or more perfluoroalkyl alkoxysilanes of the formula:

 (2)

where $Ra = R_f—Z-(CH_2)_n$ and $R_f$ = perfluoroalkyl of 3 to 18 carbons, n=1 to 3, and Z=—$CH_2$—, or —O—; and $R_1$ = the same or different $-(CH_2CH_2)_m R_2$ with m=0 to 3 with $R_2 = C_1—C_3$ alkyl;

Especially preferred compositions are $R_f$ = mixed perfluoroalkyl groups with a unimodal distribution and an average of 6 to 12 carbons, Z=—$CH_2$—, n=1, m=0 and $R_2$ = ethyl or methyl.

B. One or more substituted aminoalkyl alkoxysilanes of the formula:

 (3)

where $R_b = (R_3)_2N(CH_2CH_2NR_3)_p CH_2CH_2CH_2-$ and p=0 or 1, $R_3$ = H or $C_1$ to $C_3$ alkyl.

Especially preferred compositions are p=0, $R_1$ = methyl or ethyl, and $R_3$ = H. C. Optionally, one or more hydrocarbon silanes of the formula:

 (4)

where $R_c = C_1$ to $C_{12}$ hydrocarbyl or halogen-containing hydrocarbyl, phenyl, substituted phenyl or cyanoalkyl.

Especially preferred compositions are $R_c = C_1$ to $C_8$ alkyl, phenyl, octyl, isobutyl or cyanoethyl and $R_1$ = methyl or ethyl.

Preferably the average number of silane units containing the $R_a$ moiety (i.e., those derived from formula (2)) in the polymeric siloxane of formula (1) will range from 1 to 100 (i.e., y=1 to 100); the ratio of silane units containing $R_b$ to the silane units containing $R_a$ is to be from 1:1 to 10:1 (i.e., y=1 to 10 times x); and the ratio of silane units containing $R_c$ to silane units containing $R_a$ is to be from 0 to 5:1 (i.e., z=0 to 5 times x).

The novel polymeric siloxanes of this invention are prepared by condensing the formulae (2), (3) and (4) silane components in the desired ratio to achieve a balance of properties of emulsifiability in aqueous formulations and repellency protection when these emulsions are applied to substrates. In general, oil repellency of the substrates that have been treated with compositions of this invention is related to the relative number of $R_a$ groups in the resulting polymeric siloxane. Therefore the higher the ratio of $R_a$ groups to $R_b$ and $R_c$ groups, the greater will be the oil repellency. The water repellency is generally related on the sum of the $R_a$ and $R_c$ units. Where, for example, greater emphasis is placed on water repellency of the coated substrate than on oil repellency, a higher ratio of $R_c/R_a$ may be used to reduce the cost of the product. The emulsifiability of the siloxane in water to form a stable, low VOC aqueous emulsion is related, in large part, to the relative number of $R_b$ units in the siloxane polymer (VOC=volatile organic components; low VOC=less than 400 gm/liter of VOC, neglecting water, see ASTM Method D-3960).

The polymeric siloxanes are prepared by combining compounds of formulae (2), (3) and, if required, (4) in the desired ratio. A catalyst is then added, such as a strong acid, or, preferably, a strong base such as sodium methoxide, and the mixture is heated. A specific amount of water is then added very slowly resulting in partial hydrolysis of the trialkoxy silanes and condensation of the partially hydrolyzed silanes to form a polymeric siloxane structure, with liberation of R1OH by-product. This by-product is removed continuously during the reaction. When the water addition is complete, the reaction is heated an additional period of time, usually 2 to 24 hours, to ensure completion of the reaction. Then any residual traces of the by-product alcohol are removed under vacuum and the reaction catalyst is neutralized. Alternatively, the hydrolysis/condensation above may be carried out in multiple steps so that the (2), (3) and (4) are sequentially reacted so that they become clustered to form "blocked" type of polymeric siloxane structures.

The amount of water added during the reaction will determine the molecular weight of the siloxane polymer and may be from $\{[(n_2+n_3+n_4)/n_2]-1\}(n_2)$ to $(n_2+n_3+n_4)$, where $n_2$, $n_3$, and $n_4$ are the number of moles of components of formulae (2), (3), and (4), respectively. A slight excess of water, not to exceed $0.2(n_2+n_3+n_4)$, may be used. Greater quantities of water will normally result in a highly crosslinked product which will be more difficult, or impossible, to emulsify in water, and also reduce the durability of the siloxane coating on the substrate.

Temperatures useful for preparing the polysiloxanes of this invention are those which will allow the reaction to be completed in a reasonable period of time and typically range from about 50° C. to about 150° C., preferably from about 80° C. to about 130° C. Solvents inert to the reactants may also be used in preparing the polysiloxanes, provided that they are removed when the reaction is complete.

The polysiloxane repellents of this invention are formulated into aqueous formulations for application to substrates to impart oil and water repellent properties. These aqueous formulations contain very low levels of volatile organic components (VOC) to avoid adverse effects on the environment during application and use.

The siloxanes of this invention are readily emulsified to form water emulsions using standard, low energy agitation methods. An emulsifying agent is used and the emulsion is initially made acidic with enough acid to effectively neutralize some or all of the aminoalkylsilane ($R_b$) moieties in the polymer. Any non-oxidizing acid which will form the ammonium ion of the aminoalkylsilane is suitable, preferably a weak organic acid such as acetic acid. Aqueous emulsions may be prepared without the emulsifier, however, these do not possess long term storage stability. The siloxane may be present in the emulsion at an effective concentration, from 0.1 wt. % to about 40 wt. % based on the weight of water. Usually, for convenience, emulsions containing from 8 to 20 wt. % are produced for storage and shipment, and later diluted to an effective, lower concentration before use. The emulsions may also contain other additives, such as biocides, colorants, and the like.

Emulsifiers suitable for forming stable aqueous emulsions are those with an HLB value equal or greater than 14, preferably greater than 16. The emulsifier is used at an effective concentration, from 5 to 100 wt. % of the silane, preferably from 10 to 30 wt. %. based on the silane weight. The emulsifier may be cationic, nonionic, or amphoteric in nature. Suitable emulsifiers include, but are not limited to, ethoxylated alkyl alcohol ethers, ethoxylated alkylphenols, ethoxylated polyalcohols and polyalcohol esters, $C_{8-18}$ alkyltrimethylammonium salts $C_{8-18}$ alkyldimethylammonium salts, ethoxylated $C_{8-18}$ alkylamine salts, alpha-trimethylamino fatty acid betaines, alkylamidopropylbetaines, alkylamidohydroxypropylsultaines, perfluoroalkyl amphoteric emulsifiers of the type $R_fCH_2CHORCH_2N(CH_3)_2CH_2CO_2$ (inner salt) where R is H or acetyl, perfluoroalkylthioalkyltrialkylammonium salts of the type $R_fCH_2CH_2SCH_2CHOHCH_2N(CH_3)_3$ salts.

The emulsions are prepared by mixing the emulsifier and the acid with water at ambient temperatures. When fully mixed, the siloxane is slowly added, using standard agitation methods. Once the emulsions are prepared in this manner, they are allowed to stand for up to about 72 hours, with or without further agitation, to achieve the final equilibrium emulsion composition. Unlike many silanes and siloxanes known in the art, the aqueous emulsions of the siloxanes of this invention, when prepared as described herein, are very stable for long periods of storage. A clear transparent appearance of an emulsion of this invention indicates its stability. Poor stability is recognized by precipitation of the siloxane as a less soluble, crosslinked polymeric species due to intermolecular condensation. Furthermore, unlike the solvent based fluorocarbon siloxanes of the prior art, Nuclear Magnetic Resonance spectroscopic data have shown that the aqueous fluorocarbon siloxane emulsions of this invention contain the siloxane in an essentially completely hydrolyzed state ready for instant bonding to the substrate to provide the repellency properties. Yet the unique aqueous emulsions of this invention do not permit the hydrolyzed silanes to further self-condense to high molecular weight, water-insoluble, polysiloxane structures while in this emulsified state. These aqueous emulsions are generally stable to long term storage of one year or more, are stable to broad ranges of pH, from about 2.5 to about 9.0. are stable to temperatures of 60° C. or greater, and frequently are stable to repeated freezing and thawing conditions without undergoing coagulation and precipitation of the siloxane. Particle size measurements of the emulsions, using a Coulter N4MD light scattering instrument show particle sizes in the range of less than 10 to 100 nanometers, indicative of true emulsions or microemulsions. The hydrolyzed structures that are generated in the aqueous emulsions are believed to be of the type represented by the formula:

$$\text{HO}[\text{Si}(R_a)(\text{OH})]_x[\text{Si}(R_b)(\text{OH})]_y[\text{OSi}(R_c)(\text{OH})_2\text{OH} \tag{5}$$

Where x, y, z, Ra, Rb, and Rc are as defined above.

When the aqueous emulsions of the polysiloxanes of this invention, prepared as described above, are applied to substrates, and allowed to dry, excellent oil and water repellent properties are achieved. On many substrates, this repellency is obtained essentially instantly upon contact. It may be desirable in some cases to rinse the treated surface with water to remove residues of the emulsifiers to achieve the maximum water repellency.

The fluorocarbon siloxane repellent treatment compositions of this invention are most useful for imparting repellency to substrates having siliceous, cellulosic or proteinaceous surfaces, and to polymer substrates having pendent active o hydrogen groups, such as polyesters and polyamides. The term substrate as used herein is intended to encompass concrete and masonry products and surfaces, glass products and surfaces, textiles, paper and paperboard, leather products and cellulosic materials. Some exemplary leather products are garments, shoes and boots. Textiles include awnings, tents, tarpaulins, rainwear, canvas, asbestos, fiberglass, natural fibers, natural and synthetic yarns, woven and non-woven materials, carpets and carpet fibers. Cellulosic materials contemplated herein for treatment may include wood, wood products, fiberboard, cedar, redwood, firs, plywood, and structural timbers. Concrete and masonry substrates which may be treated vary and are intended to include any product or surface of heavy and lightweight concrete, gypsum, concrete blocks, cinder blocks, soft mud bricks, sand lime bricks, drain tiles, ceramic tiles, sandstone, plaster, clay bricks, natural stones and rocks, roofing tiles, calcium silicate bricks, slag stones and bricks, stucco, limestone, macadam, marble, mortar, terrazzo, pumice, terra cotta, porcelain, adobe, coral, dolomite, and asphalt. The treatment of surfaces may be accomplished with emulsions containing an effective concentration of the siloxane, which may be as low as 0.01 percent by weight.

Aqueous emulsions of the compounds of formula (1), in addition to imparting water and oil repellency to surfaces coated therewith, also impart improved lubricity. This increased lubricity is of course more readily observed if the substrate coated has a smooth surface. This increased lubricity, that is decreased coefficient of friction, renders the surface more scratch resistant.

EXAMPLE 1

Preparation of 2-Perfluoroalkylethyltris[2-(2-methoxyethoxy)ethoxy]silane:

556.2 gm. (4.635 mole) of 2-(2-methoxyethoxy)ethanol was added slowly to a mixture of 960.8 gm. (1.50 mole) of 2-perfluoroalkylethyltrichlorosilane and 1100 ml. of heptane at 75° C. When the addition was complete, the mixture was heated at 80° C. for an additional 24 hours. The solvent was distilled off under vacuum leaving a clear liquid product.

EXAMPLE 2

Preparation of copolysiloxane of 2-Perfluoroalkylethyltris[2-(2-methoxyethoxy)ethoxy]silane and 3-aminopropyltriethoxysilane:

106.9 gm.(0.12 mole) of the product produced in Example 1 was combined with 79.6 gm.(0.36 mole) of 3-aminopropyltriethoxysilane. 1.04 gm.(0.0048 mole) of sodium methoxide catalyst, as a 25% solution in methanol, was added and the mixture heated to 85° C. 8.37 Grams (0.465 mole) of water were added slowly and uniformly over a period of 140 minutes, with continuous removal of the byproduct alcohol. The reaction was then heated at 100° C. for 12 hours and at 120° C. for 4 hours. The mixture was vacuum stripped to remove volatile byproducts and then acetic acid was added to neutralize the catalyst, leaving a light cream colored viscous oil.

8.0 Grams of this siloxane were added slowly to a stirred mixture of 5.1 g of alpha-[2-acetoxy-3-(carboxymethyl) dimethylammonio)propyl]omega-fluoropolytetrafluoroethylene hydroxide inner salt ("Zonyl", FSK, containing acetic acid, DuPont Co.) amphoteric emulsifier in 86.9 g of water. When the addition was complete the clear emulsion of the siloxane was allowed to stand at ambient temperature for 48 hours before being used.

EXAMPLE 3

Preparation of 2-Perfluoroalkylethyltriethoxysilane 125.6 Grams (2.73 mole) of ethanol were added very slowly to a mixture of 416.3 g (0.65 mole) of 2-perfluoroalkylethyltrichlorosilane and 350 ml. of heptane at 70° C. When the addition was complete the mixture was heated for an additional 24 hours at 70° C. The solvent and excess alcohol was removed under vacuum to leave the clear cream colored liquid product.

EXAMPLE 4

Preparation of copolysiloxane of 2-Perfluoroalkylethyltriethoxysilane, methyltriethoxysilane and 3-aminopropyltriethoxysilane:

80.3 Grams (0.12 mole) of the triethoxysilane produced in Example 3 were combined with 64.1 g (0.36 mole) of methyltriethoxysilane and 53.0 g (0.24 mole) of 3-aminopropyltriethoxysilane. The catalyst, 1.30 g (0.006 mole) of sodium methoxide as a 25% solution in methanol, was added: the mixture was heated to 90° C.; and then 12.40 g (0.690 mole) of water was added very slowly and uniformly over a period of 145 minutes, with continuous removal of the by-product alcohol. The mixture was then heated at 100° C. for 6 hours, then cooled slightly and vacuum stripped to remove all volatile materials. The catalyst was then neutralized with acetic acid, to give the siloxane, a pale yellow viscous oil.

An aqueous emulsion of the above siloxane was prepared by adding 8.0 g of the siloxane slowly to an agitated mixture of 5.1 g of amphoteric fluorocarbon emulsifier, "Zonyl" FSK, containing acetic acid, in 86.9 g of water. The clear emulsion was allowed to stand without agitation for 48 hours to allow the final composition to come to equilibrium. The pH of the emulsion was 3.8. The average unimodal size of the particles in this emulsion was measured with a Coulter N4MD Particle Size instrument and found to be 13 nanometers.

EXAMPLE 5

A polysiloxane composition was prepared as in Example 4 using 100.4 g (0.15 mole) of the triethoxysilane of Example 3, 26.7 g (0.15 mole) of isobutyltrimethoxysilane, 66.3 g (0.30 mole) of 3-aminopropyltriethoxysilane, 1.30 g (0.006 mole) catalyst and 10.80 g (0.60 mole) of water. Following heating, stripping and neutralization of the catalyst a pale yellow viscous product was obtained.

An aqueous emulsion of the above siloxane was prepared by adding 8.0 g of the siloxane slowly to an agitated mixture of 2.4 g of an ethoxylated nonylphenol nonionic emulsifier, "Igepal" CO-970 (Rhone-Poulenc Co.), 0.8 g of acetic acid and 88.8 g of water. The clear, colorless emulsion was allowed to stand for 48 hours to allow the final composition to come to equilibrium. The pH of the emulsion was 4.0.

EXAMPLE 6

A polysiloxane was prepared by the procedure of Example 4 using 93.7 g (0.14 mole) of the triethoxysilane of Example 3, 38.6 g (0.14 mole) of n-octyltriethoxysilane, 46.4 g (0.21 mole) of 3-aminopropyltriethoxysilane 1.08 g of the catalyst and 8.40 g (0.467 mole) of water. Following heating, stripping and neutralization of the catalyst, a pale yellow viscous product was obtained.

An aqueous emulsion of this siloxane was prepared by adding 8.0 g of the siloxane slowly to an agitated mixture of 7.5 g of an amphoteric emulsifier, cocamidobetaine ("Mirataine" CAB-A, Rhone-Poulenc Co,), 0.8 g acetic acid and 83.7 g water. The clear colorless emulsion was allowed to stand for 48 hours for the final composition to come to equilibrium. The pH of the emulsion was 4.2. The average unimodal size of the particles in this emulsion was measured with a Coulter N4MD Particle Size instrument and found to be 97 nanometers.

EXAMPLE 7

A polysiloxane was prepared by the procedure of Example 4 using 100.4 g (0.15 mole) of the triethoxysilane of Example 3, 32.6 g (0.15 mole) of cyanoethyltriethoxysilane, 66.3 g (0.30 mole) 3-aminopropyltriethoxysilane, 1.30 g (0.006 mole) of the catalyst and 10.80 g (0.60 mole) of water. Following heating, stripping and neutralization of the catalyst, a pale yellow, viscous liquid product was obtained.

An aqueous emulsion of this siloxane was prepared by adding 8.0 g of the siloxane slowly to an agitated mixture of 2.4 g of the non-ionic emulsifier, Igepal CO-970, 0.8 g of acetic acid and 88.8 g of water. The clear, colorless emulsion was allow to stand for 48 hours to allow the final composition to come to equilibrium. The pH of the emulsion was 4.5.

EXAMPLE 8

A polysiloxane was prepared by the procedure of Example 4 using 106.9 g (0.12 mole) of the silane of Example 1, 28.8 g (0.12 mole) of phenyltriethoxysilane, 79.6 g (0.36 mole) of 3-aminopropyltriethoxysilane, 1.30g (0.006 mole) of the catalyst and 9.72 g (0.54 mole) of water. Following heating, stripping and neutralization of the catalyst, a light yellow viscous liquid product was obtained.

An aqueous emulsion of this siloxane was prepared by adding 8.0 g of the siloxane slowly to an agitated mixture of 5.1 g of "Zonyl" FSK, containing acetic acid, and 86.9 g of water. The clear emulsion was allowed to stand without agitation for 48 hours to allow the final composition to come to equilibrium. The pH of the emulsion was 3.5.

EXAMPLE 9

An aqueous emulsion was prepared of the siloxane of Example 7 using a cationic emulsifier. 8.0 g of the siloxane was added to an agitated mixture of 8.0 g of "Zonyl" FSD (DuPont Co., 30 wt. % 2-hydroxy-3-((gamma-omega-perfluoro-C6-20-alkyl)thio)-N,N,N-trimethyl-1-propyl ammonium chloride), 0.8 gm. acetic acid and 83.2 g water. The clear colorless emulsion was allowed to stand without agitation for 48 hours to allow the composition of the emulsion to come to equilibrium. The pH of the emulsion was 4.2.

EXAMPLE 10

To demonstrate the repellency properties imparted by the emulsions, the emulsions prepared above were diluted to a concentration of 0.5 weight % active ingredient and applied to several substrates. The oil and water repellence of these substrates were measured using AATCC (American Association of Textile Chemists and Colorists) Method 118-1978 wherein oil and water ratings of 0 indicate no repellency and ratings of 6 indicate the highest level of repellency. The siloxanes were applied at the rate of 1 mg. of active ingredient per square inch of substrate, and allowed to dry for 4 to 24 hours. The test pieces were then soaked in water for 30 minutes and again air dried for 24 hours before being tested for their repellency by the AATCC Method. The results are listed in Table I and show the excellent repellency properties of these novel compositions.

TABLE I

| Repellency Performance Of Siloxane Emulsions Oil/Water Repellency Ratings | | |
|---|---|---|
| Example No. | Wood | Glass |
| No Treatment | 0/0 | 0/0 |
| 2 | 5/6 | 6/6 |
| 3 | 2/3 | 6/6 |
| 4 | 3/4 | 6/6 |
| 5 | 2/5 | 6/6 |
| 6 | 4/4 | 6/6 |
| 7 | 5/4 | 6/6 |
| 8 | 4/4 | 6/6 |

EXAMPLE 11

A polysiloxane was prepared by the procedure of Example 4 using 106.9 g (0.12 mole) of the silane of Example 1, 21.4 g (0.12 mole) of isobutyltrimethoxysilane, 26.5 g (0.12 mole) 3-aminopropyltriethoxysilane, 0.78 g (0.0038 mole) of catalyst and 5.40 g (0.30 mole) of water. After heating, stripping and neutralization of the catalyst, a light yellow viscous product was obtained.

An 8.0% aqueous emulsion of this siloxane was prepared by adding 8.0 g of the siloxane to an agitated mixture of 5.1 g of "Zonyl" FSK amphoteric emulsifier (containing acetic acid)in 86.9 g of water. The clear emulsion was allowed to stand for 72 hours to allow the composition to equilibrate before testing.

EXAMPLE 12

A polysiloxane was prepared by the procedure of Example 4 using 106.9 g (0.12 mole) of the silane of Example 1, 79.6 g (0.36 mole) 3-aminopropyltriethoxysilane, 1.04 g (0.0048 mole) of catalyst and 7.56 g (0.42 mole) of water. After heating for 24 hours at 100° C., stripping and neutralization of the catalyst, a light yellow liquid product was obtained.

An 8.0% aqueous emulsion of this siloxane was prepared as in Example 11.

EXAMPLE 13

A polysiloxane was prepared by the procedure of Example 4 using 80.3 g (0.12 mole) of the triethoxysilane of Example 3, 33.6 g (0.12 mole) of octyltriethoxysilane, 26.5 g (0.12 mole) of 3-aminopropyltriethoxysilane, 0.78 g (0.0036 mole) of the catalyst and 5.40 g (0.30 moles) of water. After heating, stripping and neutralization of the catalyst, a light yellow, viscous product was obtained.

An 8.0% aqueous emulsion of this siloxane was prepared as in Example 9.

EXAMPLE 14

The emulsions of Examples 8, 11, 12, and 13 were diluted to 2% active ingredient and applied to several porous substrates at the rate of 10 mg of the active ingredient per square inch of surface. The coated substrates were dried for 24 hours, then rinsed under running water for 30 seconds. The test pieces were again dried for 24 hours and the water and oil repellency determined by the AATCC Method 118-1978. In this Method, oil and water ratings of 0 indicates no repellency, and ratings of 6 indicates the highest level of repellency. The ratings are given in Table II, showing the excellent repellent properties that were achieved with these coatings. The rating of a commercial repellent coating, Thompson's Waterseal, is included for comparison purposes.

TABLE II

REPELLENCY PERFORMANCE OF SILOXANE EMULSIONS
Oil/Water Repellency Ratings

| Example No. | Pine Wood | Red Brick | Concrete |
| --- | --- | --- | --- |
| No Treatment | 0/0 | 0/0 | 0/0 |
| 8 | 5/3 | 5/2 | 5/4 |
| 11 | 6/2 | 5/3 | 4/4 |
| 12 | 4/3 | 4/4 | 4/4 |
| 13 | 5/4 | 5/4 | 4/5 |
| Thompson's Waterseal | 0/3 | 0/3 | 0/3 |

Having thus described and exemplified the invention with a certain degree of particularity, it should be appreciated that the following claims are not to be so limited but are to be afforded a scope commensurate with the wording of each element of the claim and equivalents thereof.

We claim:

1. A polymeric fluorocarbon siloxane represented by the formula or corresponding branched polymeric structure:

where $x = 1$ to 100, $y = 1$ to 10 times x, $z = 0$ to 5 times x; $R_1$ = the same or different $\text{--}(CH_2CH_2\text{--}O\text{--})_mR_2$ with $m = 0$ to 5 and $R_2 = C_1$ to $C_3$ alkyl; $R_a = R_f\text{--}Z\text{--}(CH_2\text{--})_n$, where $R_f$ = perfluoroalkyl of 3 to 18 carbons, $n = 1$ to 3 and $Z = \text{--}CH_2\text{--}$ or $\text{--}O\text{--}$; $R_b = (R_3)_2N(CH_2CH_2NR_3\text{--})_p CH_2CH_2CH_2\text{--}$ and $p = 0$ or 1, $R_3 = H$ or $C_1$ to $C_3$ alkyl; and $R_c = C_1$ to $C_{12}$ hydrocarbyl or halogen-containing hydrocarbyl, phenyl, substituted phenyl, or cyanoalkyl.

2. A polymeric fluorocarbon siloxane of claim 1 wherein $R_f$ = mixed perfluoroalkyl groups with an average of 6 to 12 carbons, $Z = \text{--}CH_2\text{--}$, $n = 1$, $m = 0$ and $R_2$ = ethyl or methyl.

3. A polymeric fluorocarbon siloxane of claim 2 wherein $p = 0$, $R_1$ = methyl or ethyl and $R_3 = H$.

4. A polymeric fluorocarbon siloxane of claim 3 wherein $R_c = C_1$ to $C_8$ alkyl, phenyl, octyl, isobutyl or cyanoethyl.

5. An aqueous emulsion comprising from 0.1 to 40 weight percent, base on weight of emulsion, of a polymeric fluorocarbon siloxane represented by the formula:

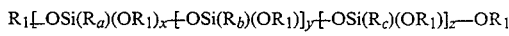

where $x = 1$ to 100, $y = 1$ to 10 times x, $z = 0$ to 5 times x; $R_1$ = the same or different $\text{--}(CH_2CH_2\text{--}O\text{--})_mR_2$ with $m = 0$ to 5 and $R_2 = C_1$ to $C_3$ alkyl; $R_a = R_f\text{--}Z\text{--}(CH_2\text{--})_n$, where $R_f$ = perfluoroalkyl of 3 to 18 carbons, $n = 1$ to 3 and $Z = \text{--}CH_2\text{--}$ or $\text{--}O\text{--}$; $R_b = (R_3)_2N(CH_2CH_2NR_3\text{--})_p CH_2CH_2CH_2\text{--}$ and $p = 0$ or 1, $R_3 = H$ or $C_1$ to $C_3$ alkyl; and $R_c = C_1$ to $C_{12}$ hydrocarbyl or halogen-containing hydrocarbyl, phenyl, substituted phenyl or cyanoalkyl, or corresponding branched polymeric structure and an effective amount of an emulsifier of sufficiently high HLB value to simultaneously retain said polymeric fluorocarbon siloxane in a substantially totally hydrolyzed state and inhibit said polymeric fluorocarbon siloxane from appreciable self-condensation and an effective amount of acid to at least partially neutralize the aminoalkysilane ($R_b$) moieties thus forming a reactive aqueous emulsion.

6. An aqueous emulsion of claim 5 wherein $R_f$ = mixed perfluoroalkyl groups with an average of 6 to 12 carbons, $Z = \text{--}CH_2\text{--}$, $n = 1$, $m = 0$ and $R_2$ = ethyl or methyl.

7. An aqueous emulsion of claim 6 wherein $p = 0$, $R_1$ = methyl or ethyl and $R_3 = H$.

8. An aqueous emulsion of claim 7 wherein $R_c = C_1$ to $C_8$ alkyl, phenyl, octyl, isobutyl or cyanoethyl.

9. An aqueous emulsion of claim 5 further comprising for every 100 parts by weight water up to 66.7 parts by weight of an emulsifier.

10. A coated surface comprising a substrate having deposited and dried thereon an emulsion comprising from 0.1 to 40 weight percent, base on weight of emulsion, of a polymeric fluorocarbon siloxane represented by the formula:

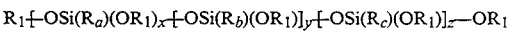

where $x = 1$ to 100, $y = 1$ to 10 times x, $z = 0$ to 5 times x; $R_1$ = the same or different $\text{--}(CH_2CH_2\text{--}O\text{--})_mR_2$ with $m = 0$ to 5 and $R_2 = C_1$ to $C_3$ alkyl; $R_a = R_f\text{--}Z\text{--}(CH_2\text{--})_n$, where $R_f$ = perfluoroalkyl of 3 to 18 carbons, $n = 1$ to 3 and $Z = \text{--}CH_2\text{--}$ or $\text{--}O\text{--}$; $R_b = (R_3)_2N(CH_2CH_2NR_3\text{--})_p CH_2CH_2CH_2\text{--}$ and $p = 0$ or 1, $R_3 = H$ or $C_1$ to $C_3$ alkyl; and $R_c = C_1$ to $C_{12}$ hydrocarbyl or halogen-containing hydrocarbyl, phenyl, substituted phenyl or cyanoalkyl, or corresponding branched polymeric structure and an effective amount of an emulsifier of sufficiently high HLB value to simultaneously retain said polymeric fluorocarbon siloxane in a substantially totally hydrolyzed state and inhibit said polymeric fluorocarbon siloxane from appreciable self-condensation and an effective amount of acid to at least partially neutralize the aminoalkysilane ($R_b$) moieties thus forming a reactive aqueous emulsion.

11. A coated surface of claim 10 wherein $R_f$=mixed perfluoroalkyl groups with an average of 6 to 12 carbons, Z=—$CH_2$—, n=1, m=0 and $R_2$=ethyl or methyl.

12. An aqueous emulsion of claim 11 wherein p=0, $R_1$=methyl or ethyl and $R_3$=H.

13. An aqueous emulsion of claim 12 wherein $R_c$=$C_1$ to $C_8$ alkyl, phenyl, octyl, isobutyl or cyanoethyl.

14. An aqueous emulsion of claim 10 further comprising for every 100 parts by weight water up to 66.7 parts by weight of an emulsifier.

15. A method of preparing an aqueous emulsion of a polymeric fluorocarbon siloxane comprising the steps of:

(a) condensing an effective amount of;
  (i) one or more perfluoroalkyl alkoxysilanes of the formula:

where $R_a$=$R_f$—Z—$(CH_2)_n$ and $R_f$=perfluoroalkyl of 3 to 18 carbons, n=1 to 3, and Z=—$CH_2$— or —O—; and $R_1$=the same or different —$(CH_2CH_2$—O$)_m$ $R_2$ with m=0 to 5 and $R_2$=$C_1$ to $C_3$ alkyl, (ii) one or more substituted aminoalkyl alkoxysilanes of the formula:

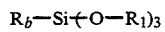

where
$R_b$=$(R_3)_2N$—$(CH_2CH_2NR_3)_p$ $CH_2CH_2CH_2$— and p=0 or 1, $R_3$= H or $C_1$ to $C_3$ alkyl, and optionally (iii) one or more hydrocarbon silanes of the formula:

$$R_c\text{—}Si(\text{O—}R_1)_3 \qquad (4)$$

where $R_c$=$C_1$ to $C_{12}$ hydrocarbyl or halogen-containing hydrocarbyl, phenyl, substituted phenyl or cyanoalkyl thus producing a polymeric fluorocarbon siloxane represented by the formula:

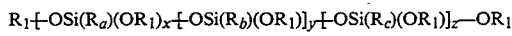

where x=1 to 100, y=1 to 10 times x, z=0 to 5 times x; $R_1$=the same or different —$(CH_2CH_2$—O$)_m R_2$ with m=0 to 5 and $R_2$=$C_1$ to $C_3$ alkyl; $R_a$=$R_f$—Z—$(CH_2)_n$, where $R_f$=perfluoroalkyl of 3 to 18 carbons, n=1 to 3 and Z=—$CH_2$— or —O—; $R_b$=$(R_3)_2N(CH_2CH_2NR_3)_p$ $CH_2CH_2CH_2$— and p=0 or 1, $R_3$=H or $C_1$ to $C_3$ alkyl; and $R_c$=$C_1$ to $C_{12}$ hydrocarbyl or halogen-containing hydrocarbyl, phenyl, substituted phenyl, or cyanoalkyl or corresponding branched polymeric structures; and (b) suspending from 0.1 to 40 percent by weight of said polymeric fluorocarbon siloxane in water containing an effective amount of an emulsifier of sufficiently high HLB value to simultaneously retain said polymeric fluorocarbon siloxane in a substantially totally hydrolyzed state and inhibit said polymeric fluorocarbon siloxane from appreciable self-condensation and an effective amount of acid to at least partially neutralize the aminoalkysilane ($R_b$) moieties thus forming a reactive aqueous emulsion.

16. A method according to claim 15 wherein $R_f$=mixed perfluoroalkyl groups with an average of 6 to 12 carbons, Z=—$CH_2$—, n=1, m=0 and $R_2$=ethyl or methyl.

17. A method according to claim 16 wherein p=0, $R_1$=methyl or ethyl and $R_3$=H.

18. A method according to claim 17 wherein $R_c$=$C_1$ to $C_8$ alkyl, phenyl, octyl, isobutyl or cyanoethyl.

19. A method according to claim 15 further comprising for every 100 parts by weight water up to 66.7 parts by weight of an emulsifier.

* * * * *